(12) United States Patent
Dehnen et al.

(10) Patent No.: US 8,286,615 B2
(45) Date of Patent: Oct. 16, 2012

(54) INTAKE MANIFOLD OF AN INTERNAL COMBUSTION ENGINE AND COOLING FLUID CHARGE AIR COOLER

(75) Inventors: Ulrich Dehnen, Kornwestheim (DE); Karl-Ernst Hummel, Bietigheim-Bissingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 12/905,745

(22) Filed: Oct. 15, 2010

(65) Prior Publication Data

US 2011/0088663 A1 Apr. 21, 2011

(30) Foreign Application Priority Data

Oct. 21, 2009 (DE) .......................... 10 2009 050 258

(51) Int. Cl.
*F02B 29/04* (2006.01)

(52) U.S. Cl. .................................. 123/542; 123/184.21

(58) Field of Classification Search ........ 123/184.21–184.61, 542, 563
See application file for complete search history.

(56) References Cited

U.S. PATENT DOCUMENTS

| 2,498,152 | A |   | 2/1950 | Burks et al. |
| 3,881,455 | A | * | 5/1975 | Belsanti ........................ 123/563 |
| 3,891,395 | A | * | 6/1975 | Winkler ......................... 422/49 |
| 4,303,052 | A | * | 12/1981 | Manfredo et al. ............ 123/563 |
| 4,436,145 | A | * | 3/1984 | Manfredo et al. ............ 165/67 |
| 4,474,162 | A | * | 10/1984 | Mason ........................... 123/563 |
| 6,116,026 | A | * | 9/2000 | Freese ........................... 60/605.2 |

FOREIGN PATENT DOCUMENTS

| DE | 102007030464 A1 | 1/2009 |
| DE | 102008006153 | 8/2009 |

OTHER PUBLICATIONS

German Patent Office, Office Action on priority application DE 10 2009 050 258.0, Mar. 3, 2010.

* cited by examiner

*Primary Examiner* — M. McMahon
(74) *Attorney, Agent, or Firm* — James Hasselbeck

(57) ABSTRACT

An intake manifold arrangement of an internal combustion engine has an intake manifold and a cooling fluid charge air cooler arranged in the intake manifold. The cooling fluid charge air cooler has cooling fluid tanks at first and second opposite ends. At least one of the cooling fluid tanks at the first end forms at least a part of the intake manifold and is an integral component of the cooling fluid charge air cooler.

9 Claims, 4 Drawing Sheets

INTAKE MANIFOLD OF AN INTERNAL COMBUSTION ENGINE AND COOLING FLUID CHARGE AIR COOLER

CROSS REFERENCE TO RELATED APPLICATIONS

This application claims the benefit under 35 USC 119 of German patent application 10 2009 050 258.0 filed in Germany on Oct. 21, 2009, and which is hereby incorporated by reference in its entirety.

BACKGROUND OF THE INVENTION

The invention concerns an intake manifold arrangement of an internal combustion engine. In intake manifolds of this kind, liquid cooling fluids, for example water, are used as a cooling medium for cooling medium-cooled charge air coolers (cooling fluid charge air cooler).

DE 10 2007 030 464 A1 discloses an intake manifold for an internal combustion engine in which a water charge air cooler arranged within the intake manifold is provided with cooling water tanks at the opposite ends. One of the cooling water tanks is embodied as an integral component of the intake manifold. The housing of the water charge air cooler is completely formed of parts of the intake manifold. At the opposite ends of the water charge air cooler, sealing elements are arranged that seal the two water tanks relative to the interior of the intake manifold.

SUMMARY OF THE INVENTION

The invention concerns an intake manifold arrangement of an internal combustion engine, in particular of a motor vehicle, comprising a cooling fluid charge air cooler arranged within the intake manifold which, at opposite ends, has cooling fluid tanks wherein at least one of the cooling fluid tanks forms at least a portion of the intake manifold.

Moreover, the invention concerns a cooling fluid charge air cooler that is adapted to be arranged within an intake manifold of an internal combustion engine, in particular of a motor vehicle, and that, at opposite ends, has cooling fluid tanks wherein at least one of the cooling fluid tanks may form at least a portion of the intake manifold.

It is an object of the present invention to design an intake manifold and a cooling fluid charge air cooler of the aforementioned kind in such a way that they can be realized as simply as possible and in a space-saving way and can be realized with simple and so as to require as few as possible of such components.

In accordance with the present invention, this is achieved in the at least one cooling fluid tank is an integral component of the cooling fluid charge air cooler.

According to the present invention, at least one of the cooling fluid tanks is thus fixedly and non-detachably connected to the cooling fluid charge air cooler, i.e., it cannot be detached from the charge air cooler without destruction of the parts. The cooling fluid charge air cooler can thus be manufactured together with the cooling fluid tank as a modular component in a simple way and so as to comprise only a few components and can be arranged in the intake manifold. In order to connect the cooling fluid tank and the cooling fluid charge air cooler with one another, a simple automated method can be employed. Moreover, the cooling fluid charge air cooler can be designed to be of a compact configuration together with the integrated cooling fluid tank so that the installation space within the intake manifold can be used optimally and the gas volume in the intake manifold is reduced. The cooling fluid charge air cooler can be supported by means of the cooling fluid tank in a simply way within the intake manifold and tightly sealed therein. For attachment of the cooling fluid charge air cooler in the intake manifold no separate fastening parts, in particular no metallic threaded inserts and/or threaded screws, are required. Since the cooling fluid tank forms part of the intake manifold and is at the same time an integral component of the cooling fluid charge air cooler, the strength of the intake manifold as a whole, in particular with respect to pressure effects and/or temperature effects and/or vibration effects of the charger and/or of the internal combustion engine, is improved. The integral configuration of the cooling fluid charge air cooler together with the cooling water tanks moreover makes manipulations difficult. The use of wrong, non-matching components and the resulting disturbances are therefore prevented in a simple way.

In an advantageous embodiment, the at least one cooling fluid tank may form part of the housing, in particular, a wall, of the intake manifold. In this way, a separate housing part of the intake manifold is no longer needed. In this way, the manufacturing expenditure for the intake manifold and the thus incurred costs are reduced.

Advantageously, the cooling fluid tanks and the housing of the intake manifold are non-detachably and seal-tightly connected to one another, in particular are welded or adhesively connected with each other. Non-detachable connections can be realized and sealed in a simpler way in comparison to detachable connections. Preferably, no separate sealing means, for example, sealing rings, are required. By means of welding or adhesives, without an additional sealing element, a seal-tight connection can also be realized in a simple way.

The cooling fluid tank and the housing of the intake manifold can be made advantageously of plastic material. Even complex shapes can be realized in a simple way from plastic material. Plastic material is moreover light-weight and robust.

In a further advantageous embodiment, the housing of the intake manifold can be provided with a closable opening for insertion of the cooling fluid charge air cooler into the intake manifold; this opening can be closed by the at least one cooling fluid tank. Through the opening, the cooling fluid charge air cooler can be simply inserted. When the cooling fluid charge air cooler is installed, the opening is closed off by the integrated cooling water tank. A separate closure lid is not required.

Advantageously, the at least one cooling fluid tank can overlap a rim area surrounding the closable opening in a radial direction relative to the insertion direction and the cooling fluid tank can be connected with its end face with the housing of the intake manifold. The end face of the cooling fluid tank is the side that extends substantially perpendicularly to the insertion direction. In this way, the cooling fluid charge air cooler can be secured in a simple way axially to the insertion direction. The cooling fluid tank can be connected with an end face weld connection, in particular by means of hot gas welding or hot plate welding, in a simple and seal-tight way with the housing of the intake manifold.

Advantageously, the cooling fluid charge air cooler can be provided at the end that is opposite (remote from) the at least one (integral) cooling fluid tank, in particular at a second cooling fluid tank, with a projecting area that extends axially to the insertion direction away from the cooling fluid charge air cooler, wherein this area is in particular an outer wall of the second cooling fluid tank or a projection and is inserted into a matching receptacle of the housing of the intake manifold and connected with the intake manifold at least at one circumferential side of this area, in particular by welding. In this way, differences between the expansions of the cooling fluid charge air cooler and the housing of the intake manifold can be compensated in a simple way in the direction axial to the insertion direction within given tolerances. The tolerance range can be predetermined by the axial expansion of the fastening area and the receptacle. The cooling fluid charge air cooler, in particular the second cooling fluid tank, can be connected by means of a circumferentially extending weld seam, in particular by means of hot gas welding, in a simple and seal-tight way with the receptacle of the housing of the intake manifold.

In a further advantageous embodiment, at least one connecting element, in particular a cooling medium conduit and/or a connecting flange, for at least one functional component of the internal combustion engine, in particular a fresh gas supply unit, a throttle flap, an exhaust gas recirculation cooler and/or an exhaust gas recirculation valve, may be an integral component of the at least one cooling fluid tank. In this way, the cooling fluid that is used for cooling the cooling fluid charge air cooler, can be used additionally for cooling other functional components of the internal combustion engine. A separate cooling circuit is thus not required. In this way, the number of required components and the required space are reduced. The intake manifold can be embodied of a very compact design together with the cooling fluid charge air cooler in combination with an exhaust gas recirculation unit.

The object is further solved by a cooling fluid charge air cooler in which the at least one cooling fluid tank is an integral component of the cooling fluid charge air cooler.

In an advantageous embodiment, the cooling fluid charge air cooler is arranged in an intake manifold wherein an outer wall of at least one cooling fluid tank forms part of the wall of the intake manifold.

BRIEF DESCRIPTION OF THE DRAWING

Further advantages, features and details of the invention result from the following description, where embodiments of the invention are explained in more detail in connection with the drawing. A person skilled in the art will consider the features disclosed in combination in the drawings, the description, and the claims also individually and combine them to other expedient combinations.

In the Figures, same components are identified with same reference numerals.

DESCRIPTION OF THE PREFERRED EMBODIMENTS

Figure 1:
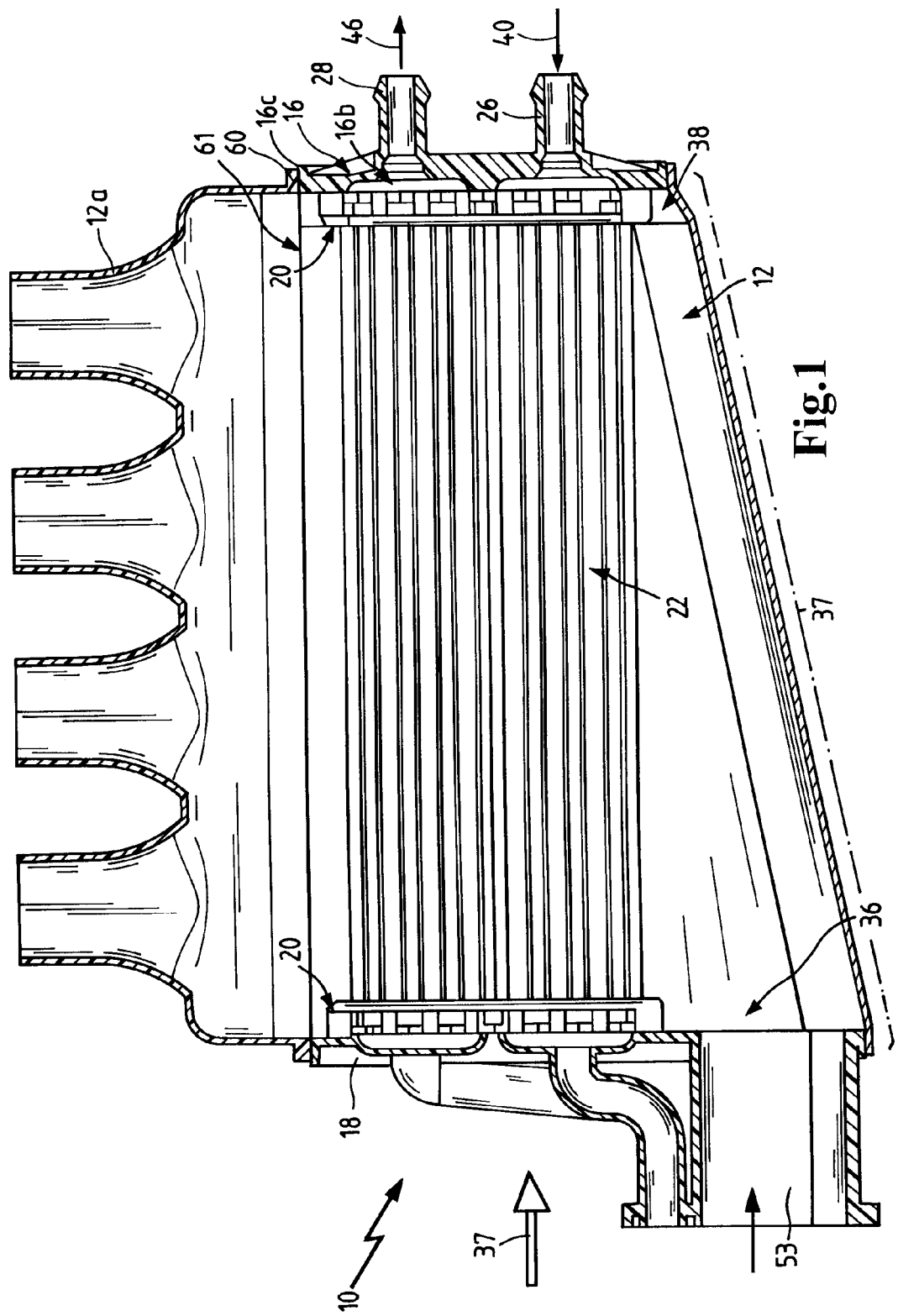
FIG. 1 shows schematically a section of a first embodiment of an intake manifold of an internal combustion engine with integrated water charge air cooler.
Figure 2:
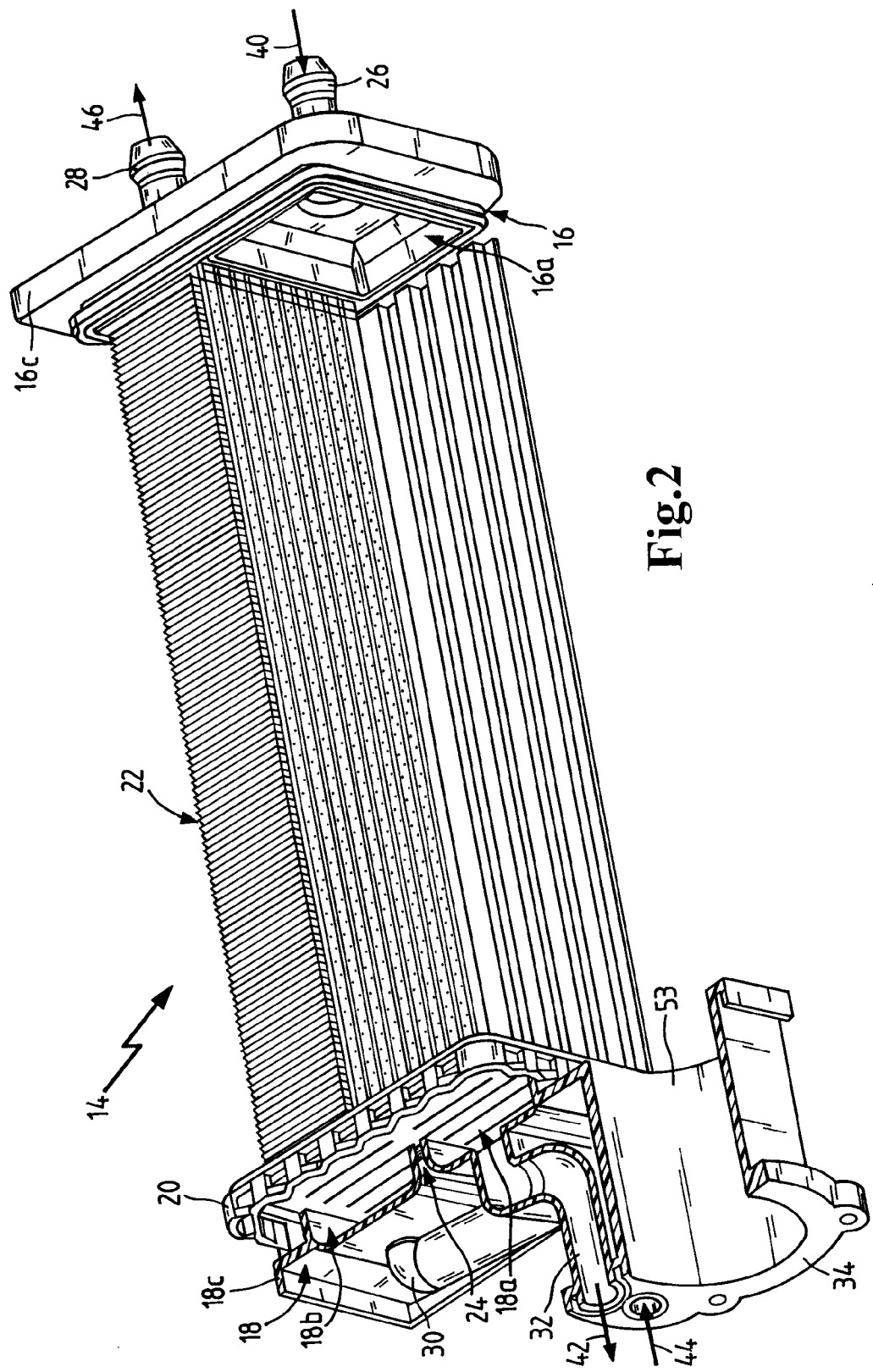
FIG. 2 shows schematically an isometric illustration of the water charge air cooler of FIG. 1.

FIGS. 1 and 2 show a first embodiment of an intake manifold arrangement of an internal combustion engine of a motor vehicle. The intake manifold 10 comprises an intake manifold housing 12 and an intake manifold bottom part 12a that are each made of plastic material.

In the intake manifold 10 a water charge air cooler 14 is arranged that is illustrated by itself in FIG. 2. The water charge air cooler 14 has at opposite ends a connecting cooling water tank 16 and a connecting cooling water tank 18, respectively, that are both made of plastic material. The connecting cooling water tank 16 and the connecting cooling water tank 18 are integral components of the water charge air cooler 14. They each are fixedly connected by means of crimp connections with an end plate 20, respectively, of the water charge air cooler 14 made of aluminum.

Between the end plates 20 two essentially square or box-shaped heat exchanger networks 22 of the water charge air cooler 14 are secured; they are however not relevant to the present invention. In FIG. 2, for simplifying the drawing, only one of the heat exchanger networks 22 and only the end plate 20 at the side of the connecting water tank 18 are shown. The end plates 20 form inner boundaries of the connecting cooling water tank 16 and of the connecting cooling water tank 18 at the sides facing the heat exchanger networks 22. The connecting cooling water tank 16 and the connecting cooling water tank 18 are each divided by a partition 24 into two chambers 16a and 16b, respectively, 18a, and 18b that are correlated with the two heat exchanger networks 22. The end plates 20 have openings through which cooling water from the chambers 16a and 16b or 18a and 18b is supplied to and removed from the heat exchanger networks 22.

At the connecting cooling water tank 16 there is an inlet connecting socket 26 and an outlet connecting socket 28 for supply and removal of cooling water flowing through the water charge air cooler 14. The inlet connecting socket 26 opens into the chamber 16a of the connecting cooling water tank 16. The outlet connecting socket 28 extends away from the chamber 16b of the connecting cooling water tank 16.

A cooling water supply conduit 30, a cooling water discharge conduit 32 and a connecting flange 34 for a throttle flap of the internal combustion engine, which throttle flap is not shown In FIGS. 1 and 2 and is not relevant in connection with the present invention, and an air inlet socket 53 for the intake manifold 10 are integral components of the connecting cooling water tank 18. The connecting flange 34 is arranged at the air inlet socket 53. The cooling water supply conduit 30, the cooling water discharge conduit 32 and the air inlet socket 53 together with the connecting flange 34 are preferably embodied monolithically together with the connecting cooling water tank 18. The cooling water supply 30 is connected with the chamber 18b and the cooling water discharge 32 is connected with the chamber 18a.

The intake manifold housing 12 has three openings. The openings 36, 38 are positioned opposite one another. During assembly, the opening 36 is closed by the connecting cooling water tank 18 and the opening 38 by the connecting cooling water tank 16. The remaining opening that connects the openings 36 and 38 and is surrounded by the frame 61 of the intake manifold housing 12 is closed by the intake manifold bottom part 12a.

The connecting cooling water tank 18 and the connecting cooling water tank 16 are provided for attachment to the intake manifold housing 12 with circumferentially extending frames 16c and 18c. This attachment can be embodied advantageously by welding or by an adhesive.

For the joining technique welding or adhesively bonding, at the openings 36 and 38 on the intake manifold housing 12 a wall area that extend in axial direction 37 is provided so that component tolerances between the intake manifold housing 12 and the water charge air cooler 14 can be compensated.

In this connection, the walls of the connecting cooling water tank 18 and of the connecting cooling water tank 16 form the side wall of the intake manifold 10.

In a further assembly step, the third remaining opening of the intake manifold housing 12 is closed by the intake manifold bottom part 12a. For this purpose, on the intake manifold bottom part 12 a circumferential frame of the connecting cooling water tank 18 and of the connecting cooling water tank 16 as well as the frame 61 of the intake manifold housing 12 are preferably seal-tightly closed by welding or by an adhesive connection, but also optionally by a screw connection.

In operation, the cooling water flows in the direction of arrow 40 through the inlet connecting socket 26 of the chamber 16a of the connecting cooling water tank 16. The cooling water passes through the heat exchanger network 22 that is facing the air inlet socket 53. From here, the cooling water flows to the chamber 18a of the connecting cooling water tank 18. From the chamber 18a the cooling water flows through the cooling water discharge conduit 32 in the direction of arrow 42 to the flange-connected fresh gas supply unit, for example, a throttle flap (not illustrated) in order to cool it. From the throttle flap the cooling water passes through cooling water supply conduit 30 in the direction of arrow 44 into the chamber 18b of the connecting cooling water tank 18. From here, the cooling water flows through the heat exchanger network 22 facing away from the air inlet socket 53 to the chamber 16b of the connecting cooling water tank 16 form where it exits the water charge air cooler 14 through the discharge connecting socket 28 in the direction of arrow 46.

Figure 3:
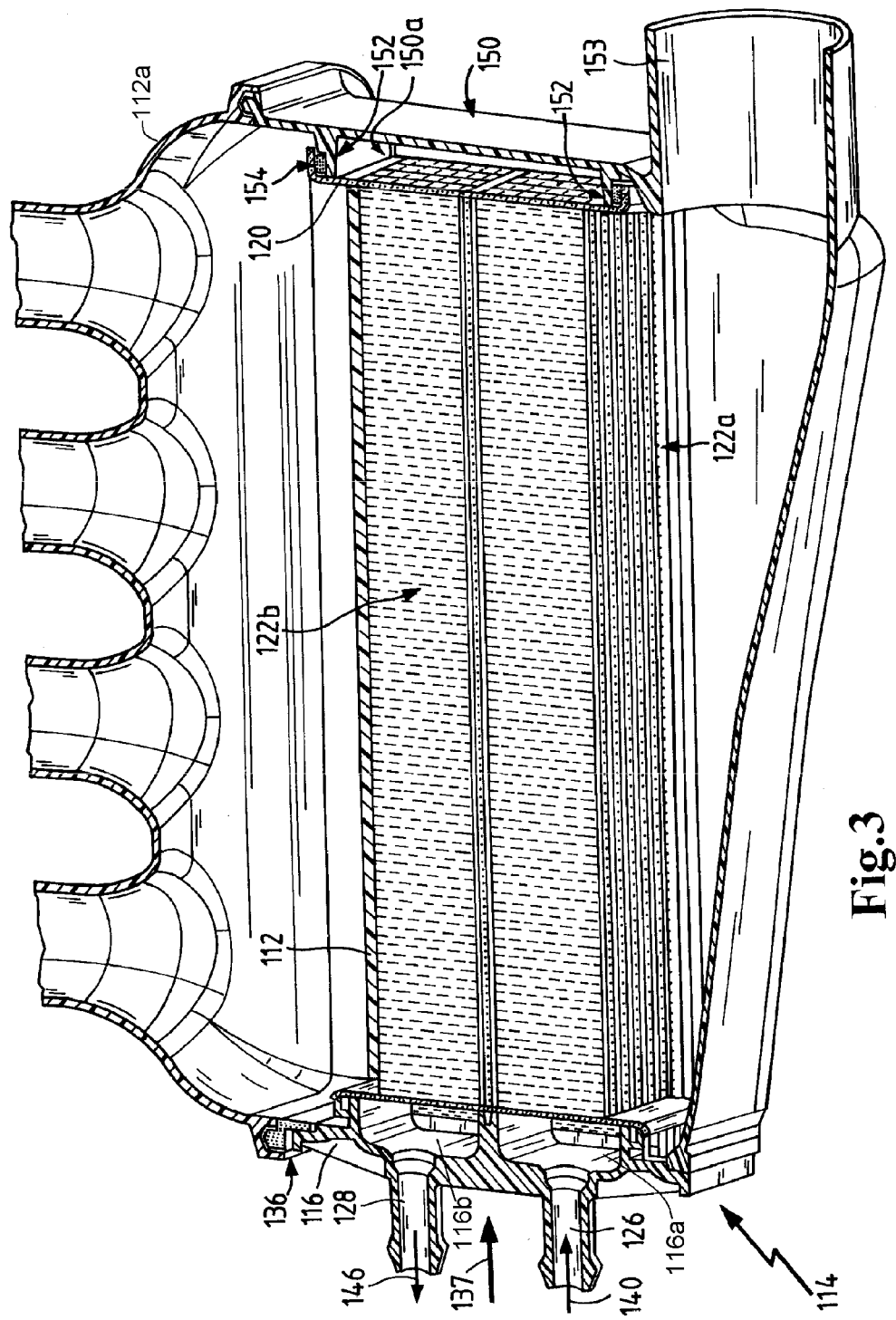
FIG. 3 shows schematically a section of a second embodiment of an intake manifold that is similar to the intake manifold according to the first embodiment illustrated in FIGS. 1 and 2.

In a second embodiment illustrated in FIG. 3, those elements that are similar to those of the first embodiment illustrated in FIGS. 1 and 2 are identified with the same reference numerals, with 100 added, so that reference is being had to the description of the details of the first embodiment. The second embodiment differs from the first in that instead of the connecting cooling water tank 18 a deflection cooling water tank 150 is provided which deflects the cooling water that exits from the first heat exchanger network 122a—viewed in the flow direction of the cooling water—and guides the cooling water into the second heat exchanger network 122b. The outer wall of the deflection cooling water tank 150 is formed by the side wall of the intake manifold housing 112. Also, the air inlet socket 153 is integral component of the intake manifold housing 112. A cooling water supply conduit 30, a cooling water discharge conduit 32, and a connecting flange 34 for the throttle flap are not provided in the second embodiment.

The insertion opening 136 for the water charge air cooler 114 is located on the side of the connecting cooling water tank 116 and is closable by its outer wall 116c. The outer wall 116c of the connecting cooling water tank 116 overlaps the rim area of the intake manifold housing 112 surrounding the insertion opening 136 in a radial direction relative to the insertion direction 137 and is welded with the end face, i.e., substantially with surfaces that are perpendicular to the insertion direction 137, to the intake manifold housing 112. For this purpose, preferably the method of hot gas welding or hot plate welding is employed. The radial overlap effects a positional fixation of the water charge air cooler 114 axially to the insertion direction 137.

The end plate 120 of the water charge air cooler 114 that is facing the deflection cooling water tank 150 has a rim area that is bent in the insertion direction 137 away from the heat exchanger network 122. It is pushed onto facing sidewalls 152 of the deflection cooling water tank 150 that extend toward the heat exchanger network 122. The side walls 152 delimit a deflection chamber 150a of the deflection cooling water tank 150 in lateral direction. Between the bent rim area of the end plate 120 and the side walls 152 of the deflection chamber 150a a cooling medium seal 154 is provided.

The end plate 120 of the water charge air cooler 114 that is facing the connecting cooling water tank is connected to the connecting cooling water tank 116 by crimping and forms together with the connecting cooling water tank 116 and a seal two cooling medium chambers. The cooling medium enters through the fill socket 126 the chamber 116a, flows from here through the cooling network 122a into the deflection chamber 150a, passes form here through the second cooling medium network 122b back to the chamber 116b and from there into the outlet socket 128. The intake manifold bottom part 112a is connected to the intake manifold housing 112 by welding, by an adhesive or by screws.

Figure 4:
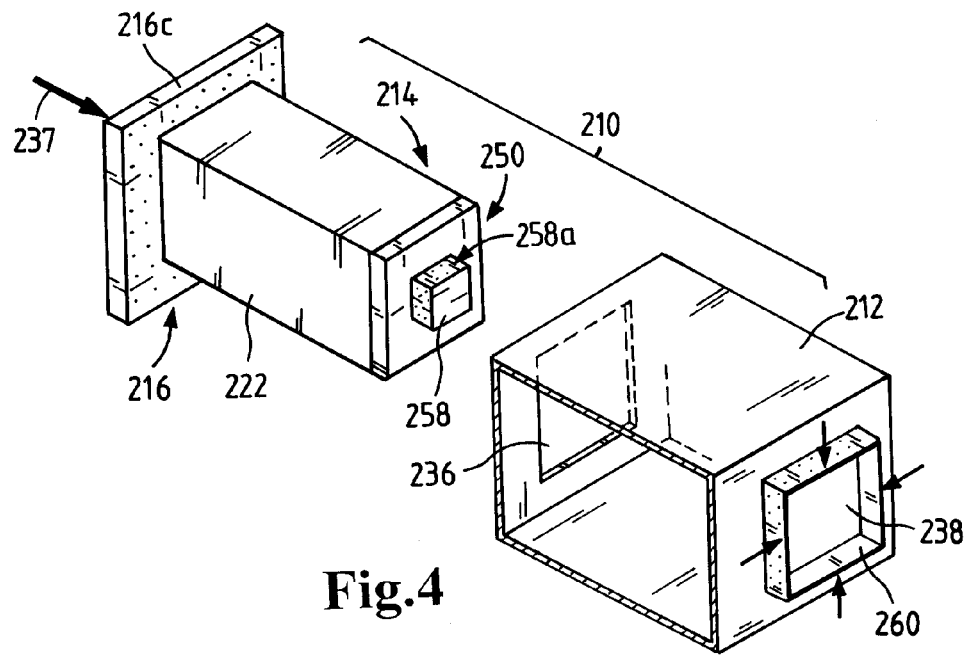
FIG. 4 shows schematically an exploded view of a third embodiment of an intake manifold which is similar to the intake manifold according to the first two embodiments illustrated in FIGS. 1 to 3.
Figure 5:
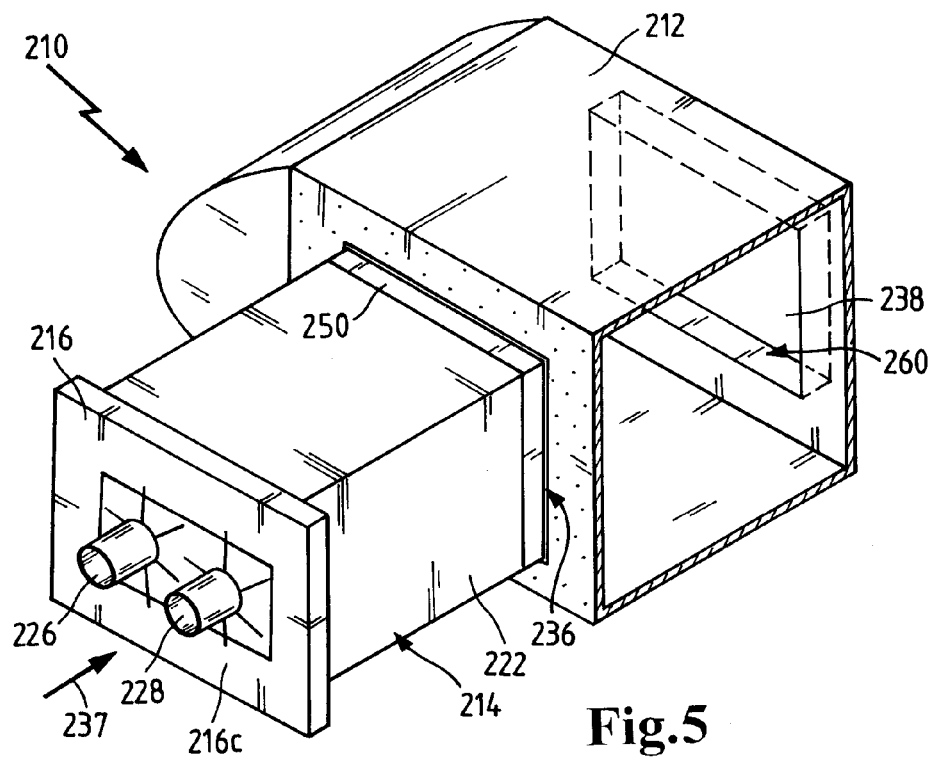
FIG. 5 shows the third embodiment of the intake manifold, shown in an exploded view in FIG. 4, in the assembled state.

In a third embodiment, illustrated in FIGS. 4 and 5, those elements that are similar to those of the second embodiment illustrated in FIG. 3, are provided with the same reference numerals, with 100 added, so that reference is being had with respect to the details of the third embodiment to the above description of the second embodiment. This third embodiment differs from the second embodiment in that the water charge air cooler 214 is provided at the end opposite (remote from) the connecting cooling water tank 216 with a right-angle projection 258. The projection 258 is arranged at the deflecting cooling water tank 250. It extends axially to the insertion direction 237 outwardly away from the water charge air cooler 214 at the end remote from the cooling water tank 216.

The projection 258 is inserted upon insertion of the water charge air cooler 214, similar to the outer wall 116c of the connecting cooling water tank 16 of the first embodiment, into a corresponding receiving opening or receptacle 238 of the intake manifold housing 212. The receiving opening 238 is surrounded at the outer side of the side wall of the intake manifold 210 by a quadrangular frame 260 which extends outwardly in axial direction relative to the insertion direction 237. The projection 258 inserted into the receiving opening 238 is welded with the frame 260 of the intake manifold 210 to the circumferential sides 258a of the projection 258 by means of the method of laser welding. The axial expansion of the frame 260 and of the circumferential sides 258a of the projection 258 enable in this connection the installation of water charge air coolers 214 with different expansions in the insertion direction within a given tolerance range. The tolerance range is provided by the axial expansion of the frame 260 and the circumferential sides 258a of the projection 258.

In all above embodiments of an intake manifold 10; 110; 210 and of a water charge air cooler 14; 114; 214 the following modifications are possible inter alia:

The invention is not limited to internal combustion engines of motor vehicles. Instead, it is also usable in connection with other internal combustion engines, for example, industrial engines.

Instead of water, also any other, preferably liquid, cooling fluid can be employed.

Instead of by welding, the cooling water tanks 16, 18; 116; 216, 118 and the intake manifold housing 12; 112; 212 can be connected with one another non-detachably and seal-tightly also with other measures. For example, they can also be connected adhesively.

Instead of being made of plastic material, the cooling water tanks 16, 18; 116; 216, 218 and/or the intake manifold housing 12; 112; 212 can be comprised also of other materials, for example, metal.

Instead of being made form aluminum, the end plates 20; 120 of the heat exchanger networks 22; 122; 222 can be comprised also of other metals or of a different kind of material, for example, plastic material.

The functions of the inlet connecting sockets 26; 126; 226 and of the outlet connecting sockets 28; 128; 228 can also be exchanged so that the cooling water in operation first flows through the exchanger network 22; 122; 222 that is facing the air inlet socket 53; 153 of the intake manifold 10; 110; 210 and only thereafter through the other heat exchanger network 22; 122; 222.

In the first embodiment instead of, or in addition to, the cooling water supply conduit 30, the cooling water discharge conduit 32 and/or the connecting flange 34 also other connecting elements for functional components of the internal combustion engine may be integral components of the cooling water tank 16. Instead of, or in addition to, the throttle flap, also other functional components of the internal combustion engine, for example, an EGR (exhaust gas recirculation) cooler and/or an EGR valve can be connected by appropriate integral connecting elements to the cooling water tank 16.

In the second and third embodiments, the end face connections instead of by welding, in particular by means of ultrasound welding, can be realized in a different way, for example also by an adhesive connection.

The outer wall 16c in the first embodiment and the projection 258 in the third embodiment can be welded to the frame 60; 260 or connected by means of adhesives to the frame 60; 260 of the receiving opening 38; 238.

While specific embodiments of the invention have been shown and described in detail to illustrate the inventive principles, it will be understood that the invention may be embodied otherwise without departing from such principles.

What is claimed is:

1. An intake manifold arrangement of an internal combustion engine, comprising:
    an intake manifold;
    a cooling fluid charge air cooler arranged in said intake manifold;
    wherein said cooling fluid charge air cooler has cooling fluid tanks at a first and a second opposite ends, said cooling fluid tanks each enclosing a cooling fluid chamber within;
    wherein said cooling fluid tanks are permanently fixed and non-detachably connected to said cooling fluid charge air cooler such that detachment leads to destruction, forming a unitary one-piece charge air cooler,
    wherein said intake manifold includes an intake manifold housing including
        an insertion opening extending through an exterior wall of said manifold housing for insertion of said cooling fluid charge air cooler into said intake manifold in an insertion direction;
    wherein said cooling fluid charge air cooler is inserted into said intake manifold housing through said insertion opening in an insertion direction,
    wherein a first one of said cooling fluid tanks forms an exterior wall of said housing,
    wherein said first cooling fluid tank closes off said insertion opening of said housing.

2. The intake manifold arrangement according to claim 1, wherein
    said at least one of said cooling fluid tanks forms a part of said housing of said intake manifold,
    wherein said at least one of said cooling fluid tanks forms a portion of an exterior wall of said intake manifold.

3. The intake manifold arrangement according to claim 1, wherein
    said at least one of said cooling fluid tanks and said housing of said intake manifold are non-detachably and seal-tightly connected to one another,
    wherein said at least one of said cooling fluid tanks and said housing of said intake manifold are connected to one another by welding or by an adhesive.

4. The intake manifold arrangement according to claim 1, wherein said at least one of said cooling fluid tanks and said housing of said intake manifold are comprised of plastic material.

5. The intake manifold arrangement according to claim 1, wherein
    said housing has a rim area surrounding said opening, and
    wherein said at least one of said cooling fluid tanks overlaps said rim area in a radial direction relative to said insertion direction, and
    wherein said at least one of said cooling fluid tanks is connected to said rim area of said housing of said intake manifold by and end face of said at least one of said cooling fluid tanks.

6. The intake manifold arrangement according to claim 1, wherein
    said at least one of said cooling fluid tanks comprises at least one connecting element for at least one functional component of the internal combustion engine,
    wherein said at least one connecting element is an integral component of said at least one cooling fluid tank,
    wherein said at least one connecting element is a cooling medium conduit or a connecting flange,
    wherein the at least one functional component is a throttle flap, a transmission oil heat exchanger, an exhaust gas recirculation cooler, or an exhaust gas recirculation valve.

7. The intake manifold arrangement according to claim 1, wherein
    said intake manifold housing comprises
        a receiving opening;
            wherein said insertion opening and said receiving opening extend through opposing exterior sidewalls of said intake manifold housing,
    wherein a second one of said cooling fluid tanks includes a circumferentially extending frame,
    wherein said circumferentially extending frame closes off said receiving opening of said housing exterior wall.

8. The intake manifold arrangement according to claim 1, wherein
    said cooling fluid tanks and said housing are comprised of a plastic material, said plastic material of said first cooling fluid tank non-detachably and seal-tightly connected by adhesive or welding to said housing such that said first cooling fluid tank seal-tightly closes off said insertion opening without use of sealing rings.

9. The intake manifold arrangement according to claim 1, wherein
    an air inlet or outlet socket is formed on said first cooling fluid tank as an integral component.

* * * * *